(12) United States Patent
Moody et al.

(10) Patent No.: US 6,183,034 B1
(45) Date of Patent: Feb. 6, 2001

(54) MOLDED UNITARY FRONT CAP FOR A MOTOR HOME

(75) Inventors: John M. Moody, Corona; John Kell, Canyon Lake, both of CA (US)

(73) Assignee: Fleetwood Enterprises, Inc., Riverside, CA (US)

( * ) Notice: Under 35 U.S.C. 154(b), the term of this patent shall be extended for 0 days.

(21) Appl. No.: 09/369,814

(22) Filed: Aug. 6, 1999

(51) Int. Cl.[7] .................................................. B60J 1/02
(52) U.S. Cl. ................................. 296/96.21; 296/190.1; 296/194; 296/197; 296/901
(58) Field of Search ..................... 296/164, 190.08, 296/190.1, 194, 196, 197, 901, 203.02

(56) References Cited

U.S. PATENT DOCUMENTS

| | | | |
|---|---|---|---|
| 3,599,740 | * 8/1971 | Martinmaas | 296/190.1 |
| 4,027,739 | * 6/1977 | Allenthorp et al. | 296/164 |
| 4,126,350 | * 11/1978 | Briers et al. | 296/190.08 |
| 4,391,465 | * 7/1983 | Piano | 296/194 |
| 4,679,847 | * 7/1987 | Dirck | 296/190.1 |
| 4,712,287 | * 12/1987 | Johnston | 296/197 |
| 4,730,870 | * 3/1988 | DeRees | 296/197 |
| 4,917,435 | * 4/1990 | Bonnett et al. | 296/190.08 |
| 5,273,340 | * 12/1993 | Nelson et al. | 296/190.08 |
| 5,286,080 | * 2/1994 | Ringdal et al. | 296/901 |
| 5,286,081 | * 2/1994 | Martin | 296/190.08 |
| 5,660,427 | * 8/1997 | Freeman et al. | 296/190.08 |
| 5,863,093 | * 1/1999 | Novoa et al. | 296/190.08 |

* cited by examiner

Primary Examiner—Joseph D. Pape
Assistant Examiner—Kiran Patel
(74) Attorney, Agent, or Firm—Price and Gess

(57) ABSTRACT

A front cap housing for a vehicle body includes an integral hollow shell member with an upper convex canopy having an aperture of a configuration to receive a front windshield. The hollow shell member includes a lower convex engine cowling. The hollow shell member is configured to be variably mounted on the front of the vehicle body and includes a pair of support posts of a U-shaped configuration extending between the upper convex canopy and the lower engine cowling. A pair of horizontal plate members extend between the pair of support posts, one above the windshield aperture and the other below the windshield aperture to thereby provide a relatively rigid mounting structure.

20 Claims, 5 Drawing Sheets

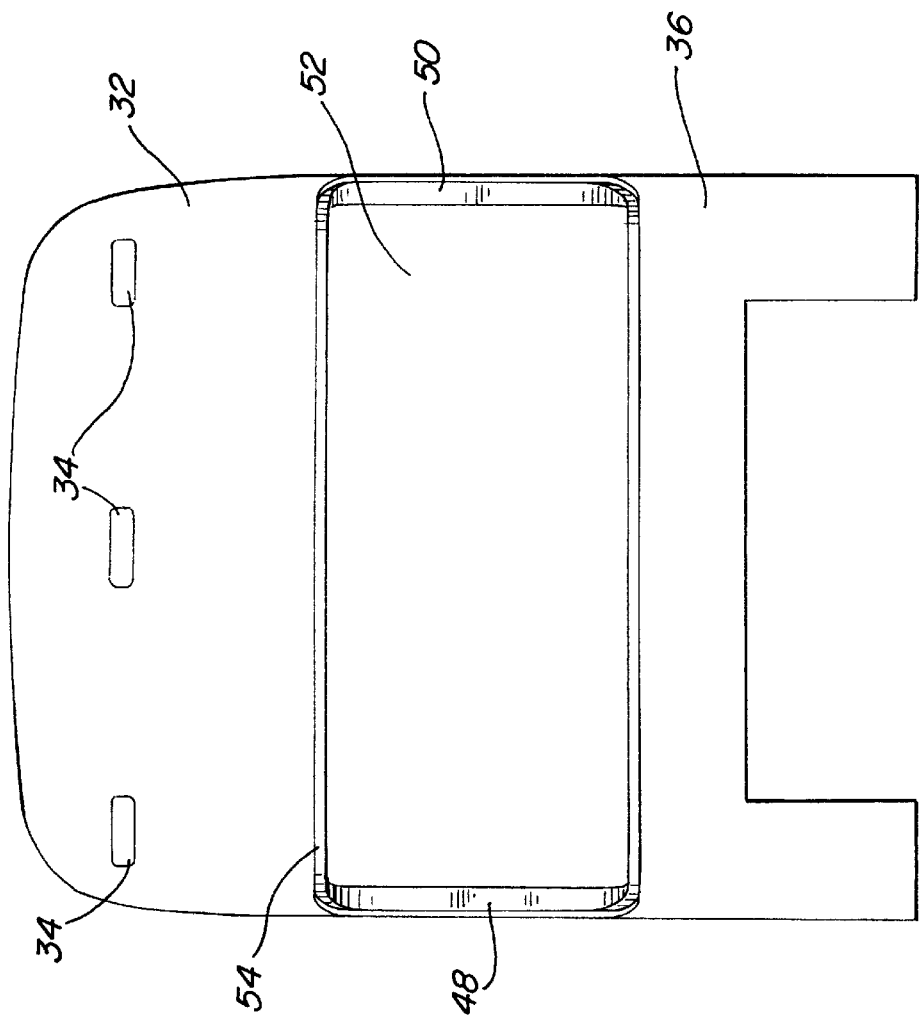
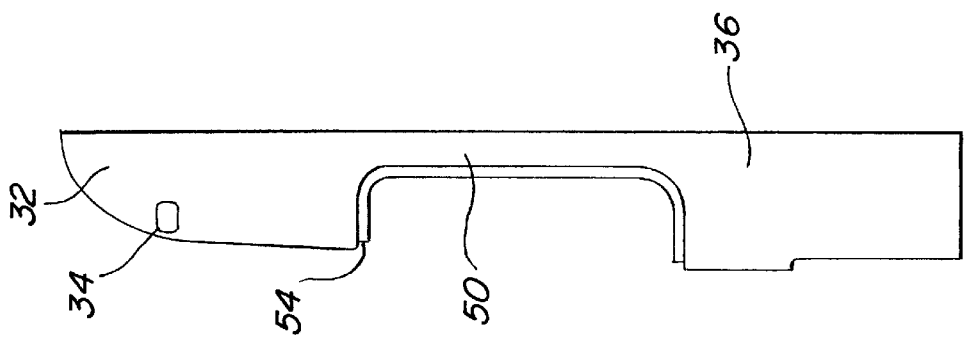

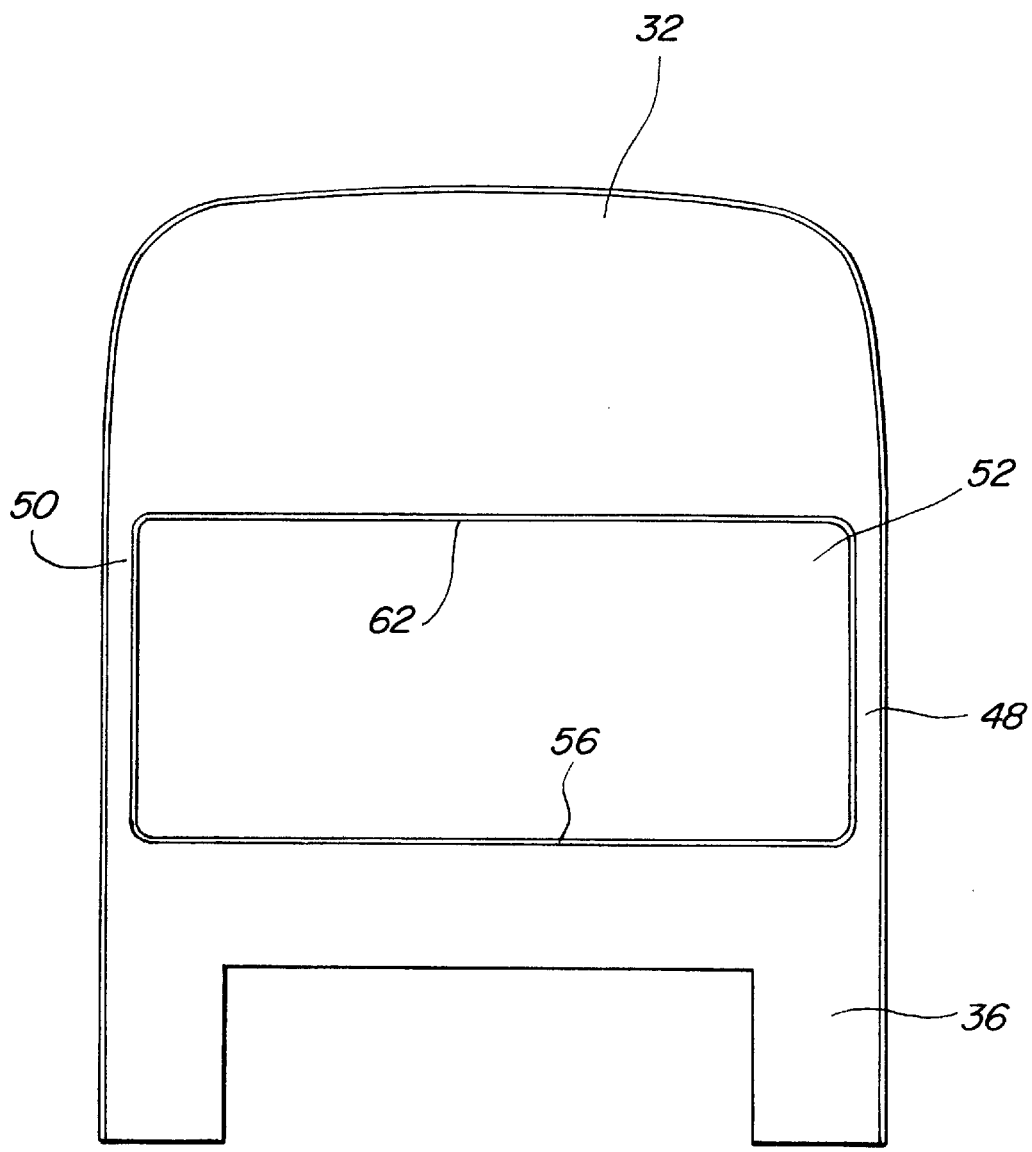

MOLDED UNITARY FRONT CAP FOR A MOTOR HOME

BACKGROUND OF THE INVENTION

1. Field of the Invention

The present invention is directed to a unitary front cap for a vehicle, such as an improved motor home, to reduce the number of component parts and to increase the rigidity of the front cap.

2. Description of Related Art

Large size vehicles, such as buses, truck cabs, and motor homes, have frequently used molded component parts in the construction of both the interior and the exterior portions of the vehicles. For a number of years, the front cap, which is a portion of the exterior housing in the forward part of a motor home vehicle, has been utilized to complement a hood access door to a front positioned drive motor, a front windshield, and a lower bumper. An example of a thermoplastic front cap of a conventional design can be seen in FIG. 5. The front cap 2 is basically a shell having an upper bulbous canopy that is interconnected by a pair of side posts 6 and 8. The lower portion of the front cap can have an opening 10 to accommodate a hood member (not shown) for providing access to the drive engine.

When the front cap 2 is mounted to the vehicle body 12, additional component parts are necessary to complete the assembly. For example, an upper windshield trim 14 and a lower windshield trim 16 are mounted within the windshield opening 18 of the front cap 2. A right A pillar cover 20 and a left A pillar cover 22 are further required to complement the respective upper windshield trim 14 and lower windshield trim 16. A plywood dash base 24 can be further covered with a vinyl cover member 26 and the dash base 24 can then be sealed with a rubber strip 28 to the interior of the lower portion of the front cap 2.

As can be determined, there are a number of finishing steps that are required in the conventional mounting and assembly of a front cap on a motor home that can be costly in both component parts and labor requirements. Additionally, a problem frequently occurs when parts must be sealed together to prevent air leaks. The conventional front cap also requires finishing steps, for example, for the edges in the windshield aperture which requires cutting a thermoplastic fiberglass material with resulting labor costs and nuisance dust and debris.

The prior art is still seeking to optimize the assembly of vehicles, such as motor homes in an economical and efficient manner.

SUMMARY OF THE INVENTION BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings.

FIG. 2 is a front elevated view of the front cap of FIG. 1;

FIG. 3 is a side view of the front cap of FIG. 1;

FIG. 4 is a rear elevated view of the front cap of FIG. 1;

SUMMARY OF THE INVENTION

Figure 1:
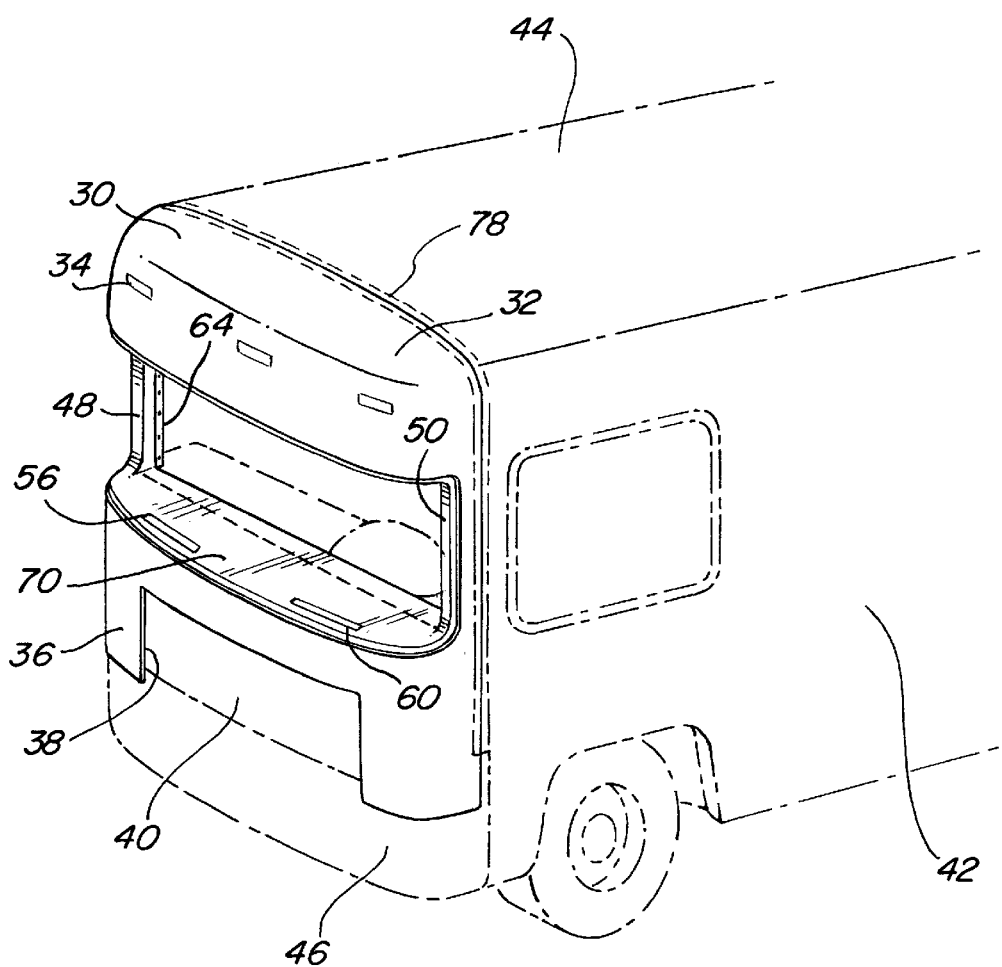
FIG. 1 is a perspective view of a front cap of the present invention in the environment of a motor home.
Figure 5:
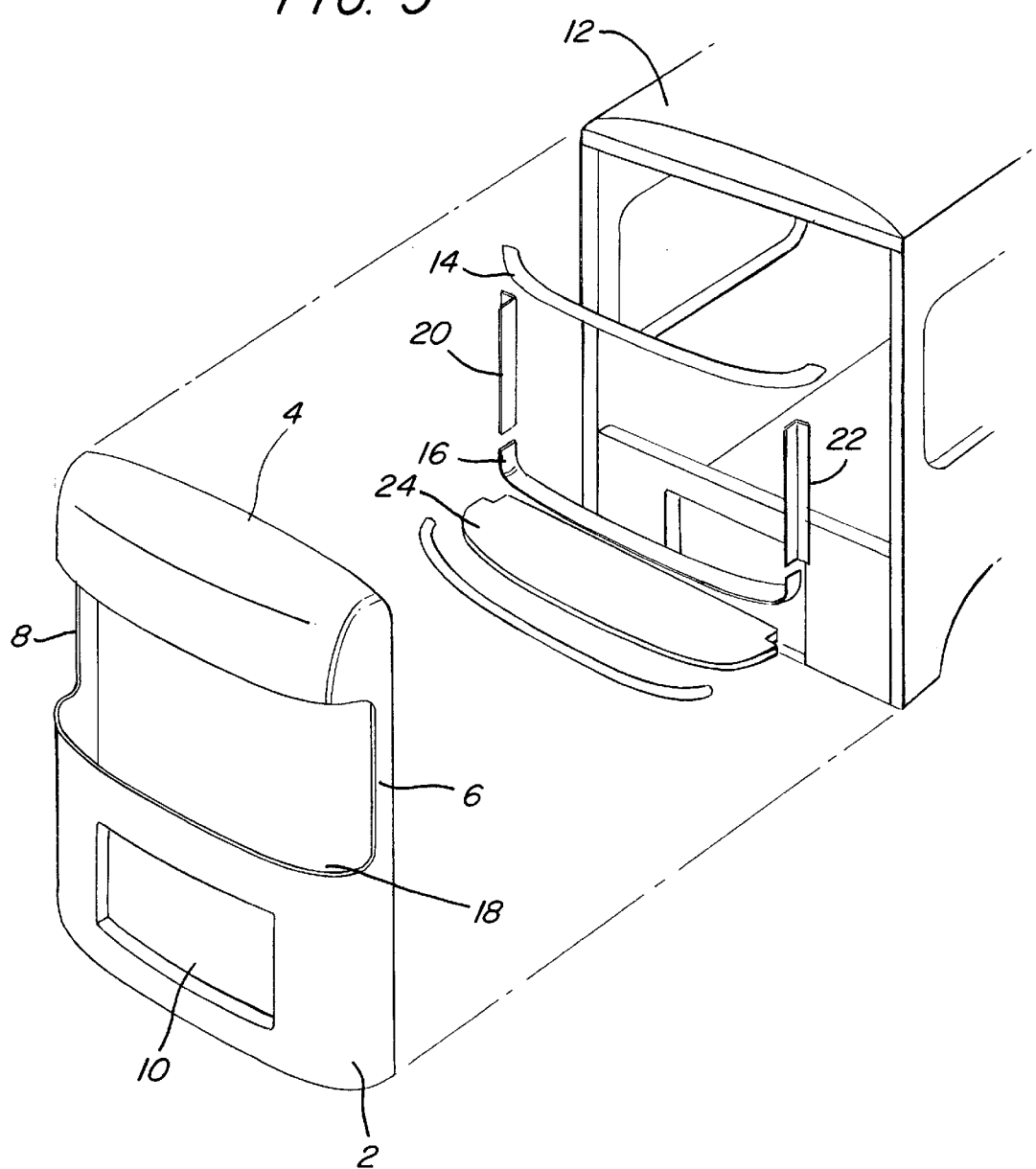
FIG. 5 is a schematic exploded perspective view of a conventional front cap design.

The present invention provides an improved motor vehicle home that can be manufactured with reduced labor cost and component parts.

A front cap housing is provided that can be attached to a roof and side walls of a vehicle, such as a motor home. The front cap housing has an integral shell member with an upper canopy and a lower engine cowling. The upper canopy includes a pair of support posts of a U-shape cross-sectional configuration that extend downward along the outer perimeter of a windshield aperture. The windshield aperture is further surrounded by a recessed flange to provide support for a windshield that is adhesively attached to the shell member. A first horizontal plate member can extend across the shell member below the windshield aperture to provide rigidity to the shell member.

The first horizontal plate member has a depth of approximately the same distance as the upper canopy and the lower engine cowling. The upper canopy can be of a convex configuration on the exterior surface and the lower engine cowling is also of a convex configuration on the exterior surface. The first horizontal plate member extends rearwardly to interface with the dashboard and can be fastened to the forward bulkhead of the motor home. A second integral horizontal plate member extends across the shell member and above the windshield aperture so that it extends below a storage area in the driver compartment of the motor home. Again, the second horizontal plate member can be fastened by appropriate screws to the motor home body. The side posts can also be fastened by rivets with extruded side plates used to support the rivets through the side post to tubular A pillar.

The first and second horizontal plate members are approximately parallel to each other and with the side posts provide rigidity to the shell member and support to the windshield aperture. The horizontal plate members further assist in sealing the structure to prevent air leaks while the additional torsional rigidity that is provided to the front cap helps reduce interior noise and vibration. As can be appreciated, the integral shell housing results in less component parts and therefore easier assembly while reducing the labor time necessary.

DETAILED DESCRIPTION OF THE PREFERRED EMBODIMENTS

The following description is provided to enable any person skilled in the art to make and use the invention and sets forth the best modes contemplated by the inventors of carrying out their invention. Various modifications, however, will remain readily apparent to those skilled in the art, since the general principles of the present invention have been defined herein specifically to provide a molded unitary front cap for a vehicle, such as a motor home.

While the present invention is disclosed in the drawings directed to a motor home, it can be readily understood that it can be utilized for a bus or other vehicle while enjoying the advantages of the present invention.

Referring to FIG. 1, the front cap 30 can be intricately splash-molded from a polyester, fiberglass fiber reinforced, resin material having a gel coating surface. The front cap 30 includes an upper canopy 32 that also can be appropriately configured to accommodate running lights 34. As can be appreciated, the front cap 30 can have decorative or design features molded into its shell, along with utilitarian features, such as mounting flanges and apertures for lights and headlights. Thus, the present invention is not to be construed as limiting the ability of a designer to add decorative features to accomplish a particular style desired for the vehicle.

A lower engine cowling 36 can have an appropriate aperture 38 to accommodate a hood for providing access to an engine that is mounted in the forward part of the vehicle. The vehicle also includes side walls 42 and a roof 44. A bumper guard 46 can be mounted below the lower engine cowling 36.

The upper canopy 32 is connected to the lower engine cowling 36 by a pair of side posts 48, 50. The aperture 52 between the side post and the upper canopy and the lower engine cowling is of a dimension to accommodate a windshield. This windshield aperture 52 is surrounded by a recessed flange 54 that can support both a sealant and the windshield so that it is adhesively fastened to the front cap 30.

A first horizontal plate 56 extends traversely across the front cap 30 relative to the longitudinal axes of the respective side posts 48, 50. The first horizontal plate extends inward from the exterior surface of the front cap 30 between the respective side posts 48, 50. A pair of elongated vent holes, or apertures 58, 60 can be connected by appropriate ducting or vent holes to provide forced air ventilation to the windshield.

A second horizontal plate 62 also extends traversely to the respective side posts 48, 50 and parallel to the first horizontal plate 56. The respective horizontal plates 56, 62 along with the side posts 48, 50 provide a rigidity to the front cap 30 and additional support for the mounting of the windshield. The side post 48, 50 have an approximately U-shape cross sectional configuration so that they can be mounted on the side walls 42 of the motor vehicle and more particularly so that they encompass the tubular A pillars of the side walls. Fittings 64, 66 can be mounted on the interior of the respective side posts 48, 50 to receive rivets for fastening directly to the steel tubing that constitute the A pillars. Additionally, appropriate fasteners, such as threaded screws can be mounted through the respective first horizontal plate 56 and second horizontal plate 62 for fastening to the bulkhead and frame of the motor vehicle.

The depth of the front cap 30 is approximately 12 inches, although this can vary depending upon the particular motorhome design. The depth of the respective first and second horizontal plates 56, 62 are also approximately twelve inches. The thickness of the shell of the front cap 30, including the side post and horizontal plates can be within the approximate range of ⅛ inch to ¼ inch. The front cap 30 is appropriately splash-molded from a polyester, fiberglass fiber, reinforced resin having a gel coating surface.

A front elevated view of the front cap 30 can be seen in FIG. 2 with a side elevated view seen in FIG. 3. A rear elevated view is seen in FIG. 4.

Figure 6:
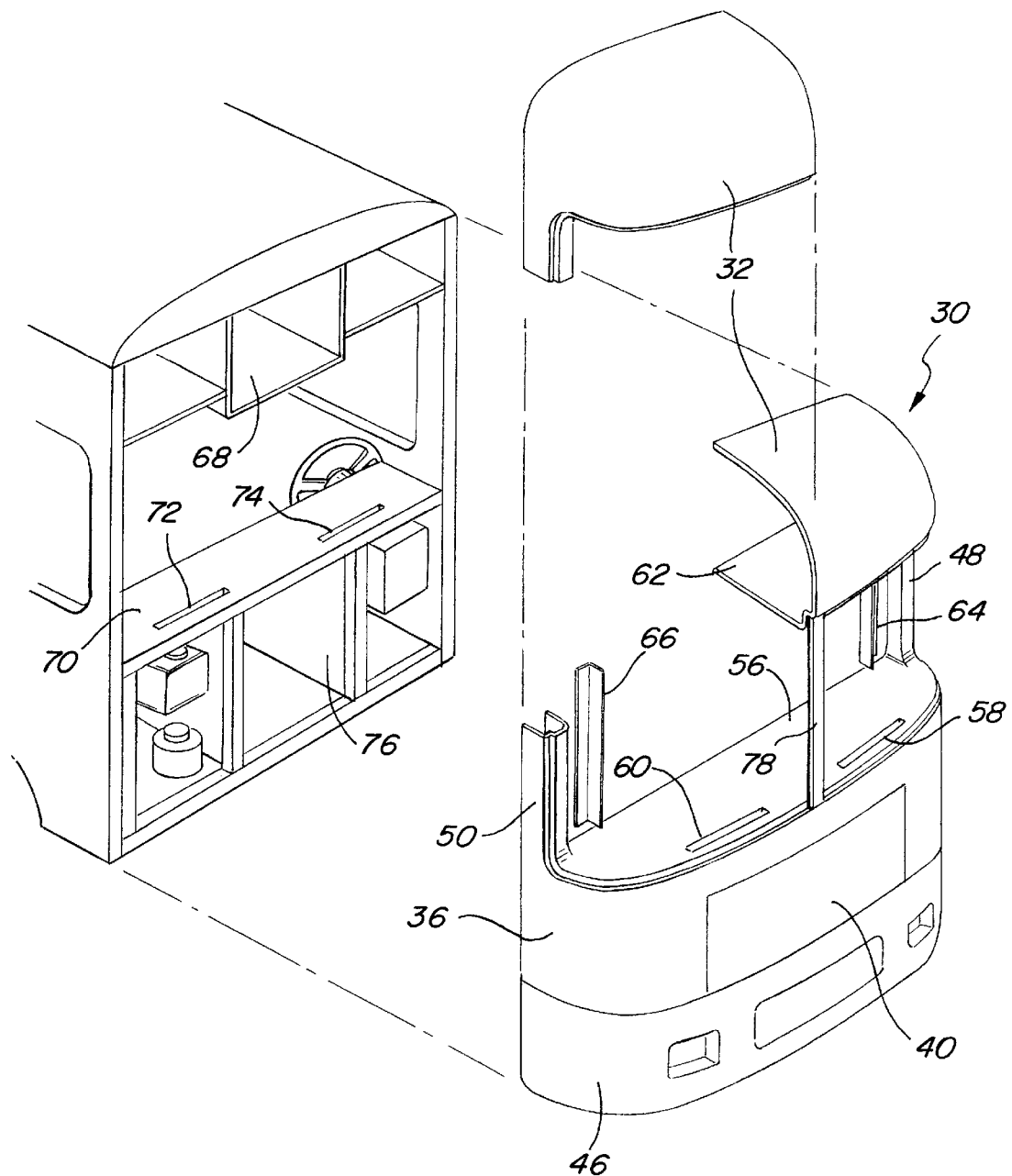
FIG. 6 is a schematic exploded perspective view of an improved motor home of the present invention.

Referring to FIG. 6, the front portion of a motorhome body is exposed in a schematic manner to disclose the overhead storage compartments 68, the dashboard 70, the defrost vents 72, 74 and the engine compartment 76.

As can be seen by the dashed lines 78 of FIG. 1, the front cap 30 can be mounted by a sealing flange 78 that is riveted to the edge of the front cap 30 as it extends respectively over the roof 44 and the side walls 42. When appropriately mounted, the second horizontal plate 62 is positioned beneath the overhead storage compartment 68, while the first horizontal plate is positioned over the dashboard bulkhead 70 and appropriately in line with the defrost vent 72, 74 so that the apertures 60, 58 can ventilate the windshield. Appropriate fasteners (not shown) can be used to further secure the respective first horizontal plate 56 and second horizontal plate 62 to the motor vehicle. Additionally, decorative padding features can extend over each of the respective horizontal plates to provide a finished luxurious look. Side fittings 64, 66 can be used to secure the appropriate side posts 48, 50 about the A pillars (not shown) that are mounted on each side wall 42 of the motorhome. A reinforcing support bar 78 formed, for example, of steel can be used for further supporting the center portion of the windshield.

Since the respective horizontal plates 56, 62 along with the U-shaped cross sectional side posts 48, 50 provide significant torsional strength to front cap 30, there is a reduction in vibration and noise, along with providing secure support for the mounting flange about the windshield aperture 52. The horizontal plates 56, 62 not only provide additional anchoring points for the front cap 30, but because they are integral with the front cap shell 20, they remove any sealing problems immediately adjacent the windshield aperture and thereby prevent unnecessary air leakage into the motor vehicle cabin.

Those skilled in the art will appreciate that various adaptations and modifications of the just-described preferred embodiments can be configured without departing from the scope and spirit of the invention. Therefore, it is to be understood that within the scope of the appended claims, the invention may be practiced other than as specifically described herein.

What is claimed is:

1. A front cap housing for a vehicle body, comprising:
   an integral shell member having an upper canopy with an aperture of a configuration to receive a windshield and a lower engine cowling, the shell member is configured to be vertically mounted on a front of the vehicle body, the shell member includes a pair of integral horizontal plate members extending across the shell member, one above the windshield aperture and the other below the windshield aperture to provide rigidity to the shell member and to extend inwardly from an exterior side of the shell member.

2. The front cap housing of claim 1, wherein the upper canopy includes a pair of support posts of a U-shape cross-sectional configuration.

3. The front cap housing of claim 1, wherein the aperture is surrounded by a recessed flange to support a windshield.

4. The front cap housing of claim 1, wherein a horizontal plate member below the windshield aperture has a pair of apertures for enabling a ventilation of the windshield.

5. The front cap housing of claim 1, wherein the upper canopy and the lower engine cowling have convex shapes towards the exterior side of the shell member and the pair of horizontal plate members have a depth substantially the same size as the upper canopy and the lower engine cowling.

6. The front cap housing of claim 1, wherein the thickness of the shell member is approximately ¼ inches or less.

7. The front cap housing of claim 1, wherein the shell member is splash-molded from a polyester fiber reinforced resin with a gel coat surface.

8. A front cap housing for a vehicle body with a dashboard, a front windshield and a forward engine, comprising:
   an integral hollow shell member molded of a reinforced plastic with an upper convex canopy with an aperture of a configuration to receive the front windshield and a lower convex engine cowling, the hollow shell member is configured to be vertically mounted on a front of the vehicle body, the hollow shell member includes about the periphery of the windshield aperture a pair of support posts of a folded configuration extending between the upper convex canopy and the lower engine cowling and a pair of horizontal plate members extending across the shell member, one horizontal plate member extends between the pair of support posts above the windshield aperture and the other horizontal plate member extends below the windshield aperture to provide a relatively rigid mounting structure for the windshield.

9. A front cap housing for a vehicle body with a front windshield and a forward engine, comprising:

an integral hollow shell member molded of a reinforced plastic with an upper convex canopy with an aperture of a configuration to receive the front windshield and a lower convex engine cowling, the hollow shell member is configured to be vertically mounted on a front of the vehicle body, the hollow shell member includes a pair of support posts of a folded configuration extending between the upper convex canopy and the lower engine cowling and at least one horizontal plate member extending across the shell member and between the pair of support posts, the horizontal plate member extends inwardly to provide rigidity to the shell member.

10. The front cap housing of claim 9, wherein the upper canopy includes a pair of support posts of a U-shape cross-sectional configuration.

11. The front cap housing of claim 9, wherein the aperture is surrounded by a recessed flange to support a windshield.

12. The front cap housing of claim 9, wherein a horizontal plate member below the windshield aperture has a pair of apertures for enabling a ventilation of the windshield.

13. In a motor home having side walls with forward A pillar supports, a roof, forward overhead storage compartments, a dashboard, and a forward engine, the improvement of a front cap housing for sealing to the side walls and roof comprising:

an integral hollow shell member of a molded reinforced resin with an supper convex canopy with an aperture of a configuration to receive the front windshield and a lower convex engine cowling, the hollow shell member is configured to be vertically mounted on the roof and side wall A pillar supports and to extend across the forward engine, the hollow shell member includes a pair of support posts of an approximately U-shape to, respectively, extend about A pillar supports and at least a first horizontal plate member extending across the shell member and traverse to a longitudinal direction of the pair of support posts to provide rigidity to the shell member.

14. The motor home of claim 13, wherein the first horizontal plate member extends between the pair of support posts and inwardly towards the dashboard beneath the windshield aperture.

15. The motor home of claim 14 further including a second horizontal plate member extending traversely to the longitudinal direction of the pair of support posts and inwardly above the windshield aperture and beneath the overhead storage compartments.

16. The motor home of claim 15, wherein the aperture is surrounded by a recessed flange to support a windshield.

17. The motor home of claim 15, wherein the first horizontal plate member below the windshield aperture has a pair of apertures for enabling a ventilation of the windshield.

18. The motor home of claim 15, wherein the upper canopy and the lower engine cowling have a convex shape towards the exterior side of the shell member and the first and second horizontal plate members have a depth substantially the same size as the upper canopy and the lower engine cowling.

19. The motor home of claim 15, wherein the thickness of the shell member is approximately ¼ inches or less and the depth of the shell member is approximately 12 inches.

20. The motor home of claim 15, wherein the shell member is splash-molded from a polyester fiber reinforced resin with a gel coat surface.

* * * * *